March 15, 1932.    C. K. RAINEY    1,849,382
ACCOUNT SYSTEM
Filed May 26, 1930    3 Sheets-Sheet 1

Inventor
Clifton K. Rainey
By C. C. Hines
Attorney

March 15, 1932.　　　C. K. RAINEY　　　1,849,382
ACCOUNT SYSTEM
Filed May 26, 1930　　　3 Sheets-Sheet 2

Inventor:
Clifton K. Rainey,
By C. C. Hines,
Attorney.

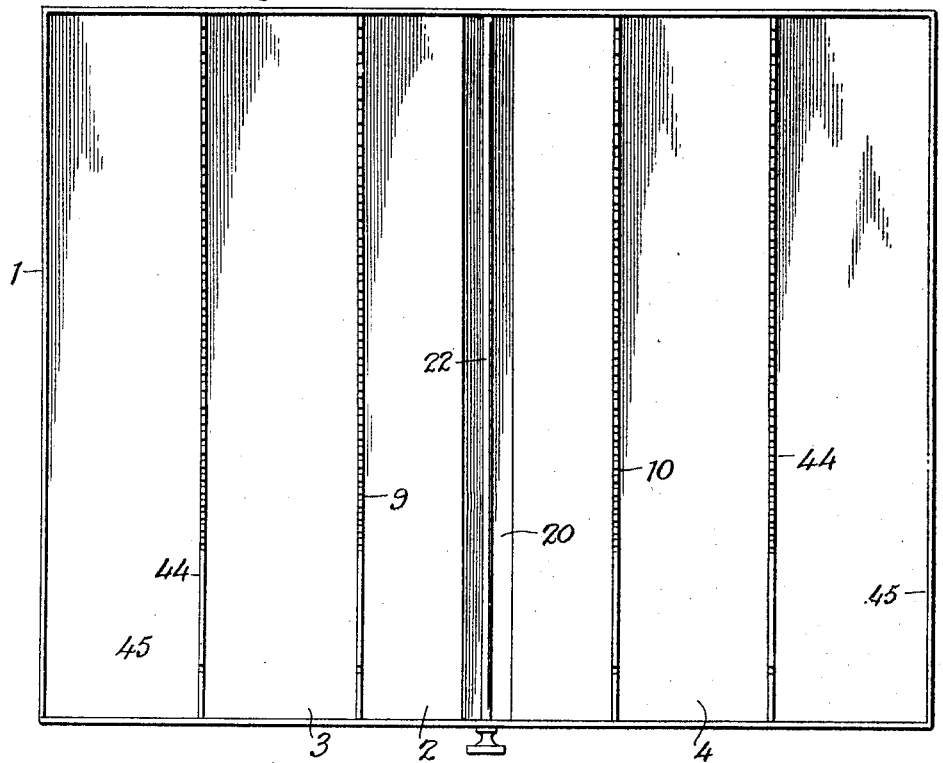
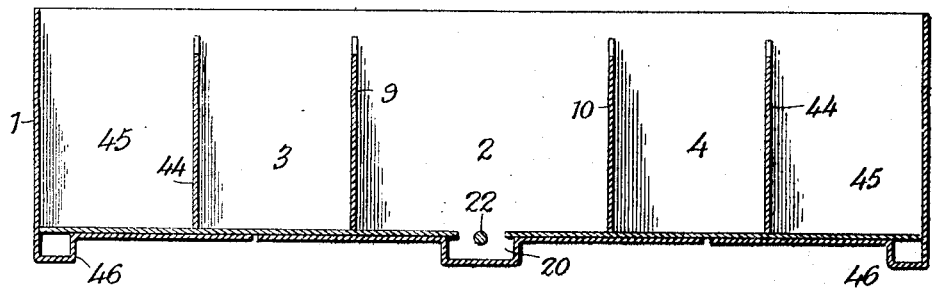

Patented Mar. 15, 1932

1,849,382

UNITED STATES PATENT OFFICE

CLIFTON K. RAINEY, OF KNOXVILLE, TENNESSEE, ASSIGNOR TO ACCOUNTING EQUIPMENT CORPORATION, A CORPORATION OF TENNESSEE

ACCOUNT SYSTEM

Application filed May 26, 1930. Serial No. 455,802.

This invention relates to improvements in account systems of that kind commonly used by banks, stores and other financial and commercial institutions for keeping a record, preferably day by day, of debits, credits and balances of the individual accounts, and wherein loose leaf ledger or statement sheets or cards are employed on which the entries are made or posted showing the changes in the accounts as they occur and the balances as they vary from time to time or from day to day. The invention is designed to provide a ready and convenient means for the use of banks in keeping account of the balances of depositors or for the use of stores and other commercial institutions in keeping accounts of their customers, and for other varied similar uses.

In my prior Patent No. 1,271,080, dated July 2, 1918, I disclose an account system comprising a cabinet or tray having compartments arranged side by side, account sheets in one of the compartments, division sheets in another compartment for separating therein slips bearing account memoranda pertaining to different account sheets, and means for indicating the account sheets to which the memoranda separated by the division sheets relate.

The present invention embodies an account system employing basically the same principle of separation by division sheets of account sheets and slips bearing account memoranda pertaining to different account sheets and means for indicating the account sheets to which the memoranda separated by the division sheets relate as that disclosed and broadly claimed in my aforesaid patent, but provides a novel construction of compartmented cabinet and division sheets for receiving, separating and indicating debit and credit memoranda so as to permit rapid inspection and application or removal or adjustment of debit and credit memoranda slips and the arrangement of said slips to effect a great saving of time and labor in keeping accounts and also to permit posting of unposted memoranda to be carried on at most convenient times.

The invention further provides a construction of compartmented tray and division and follower sheets whereby a balanced arrangement and compactness of parts is secured to permit a larger number of account records to be accommodated in an account tray of given size.

The invention still further provides novel means for retaining and locking in position the division sheets and front and rear followers.

The invention consists of the features of construction, combination and arrangement of parts, hereinafter fully described and claimed, reference being had to the accompanying drawings, in which:—

Fig. 6 is a top plan view of a cabinet or tray having a plurality of compartments on each side of its center compartment.

Fig. 7 is a vertical transverse section of the same.

Figure 1:
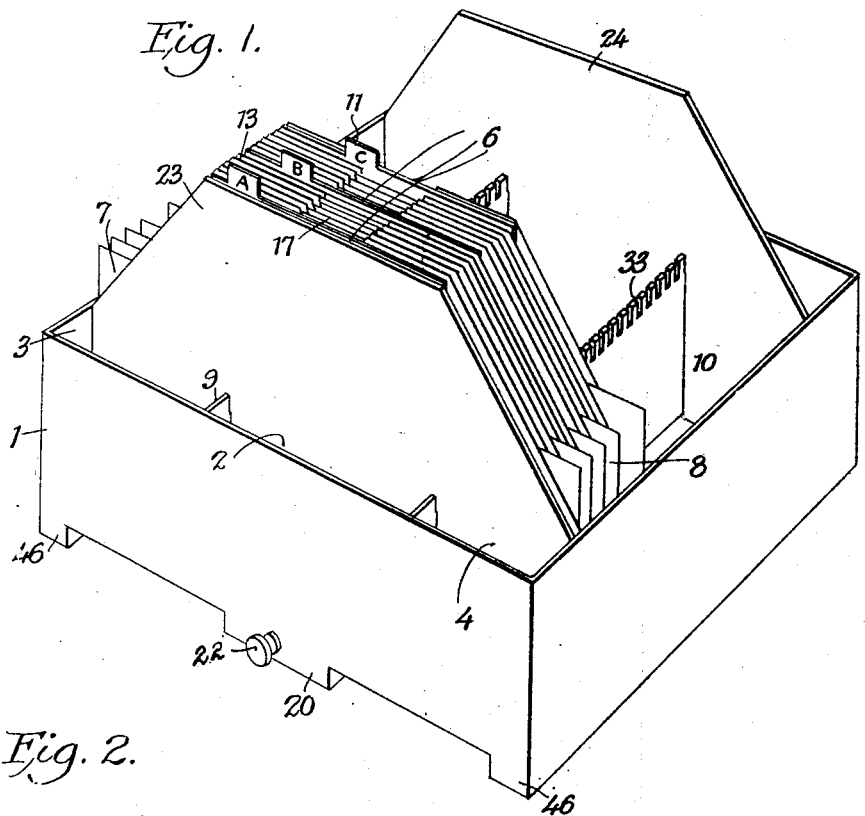
Fig. 1 is a perspective view of an account cabinet or tray and associated elements employed in my improved account system.
Figure 2:
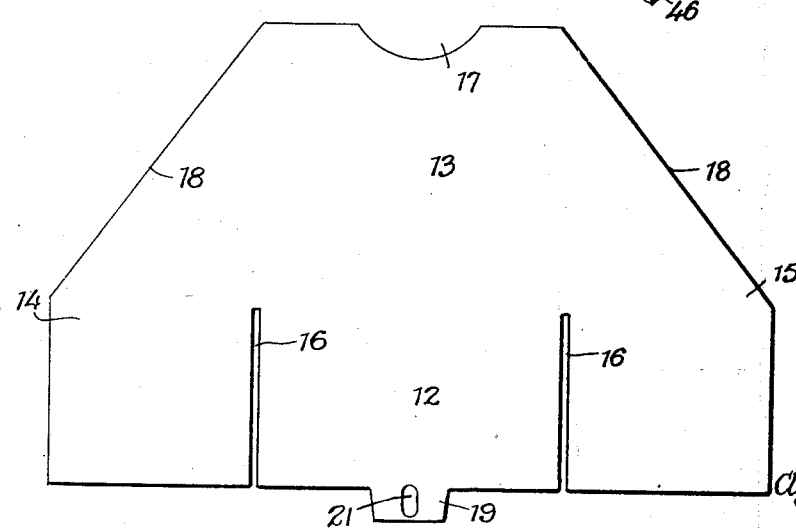
Fig. 2 is a view of a division card.
Figure 3:
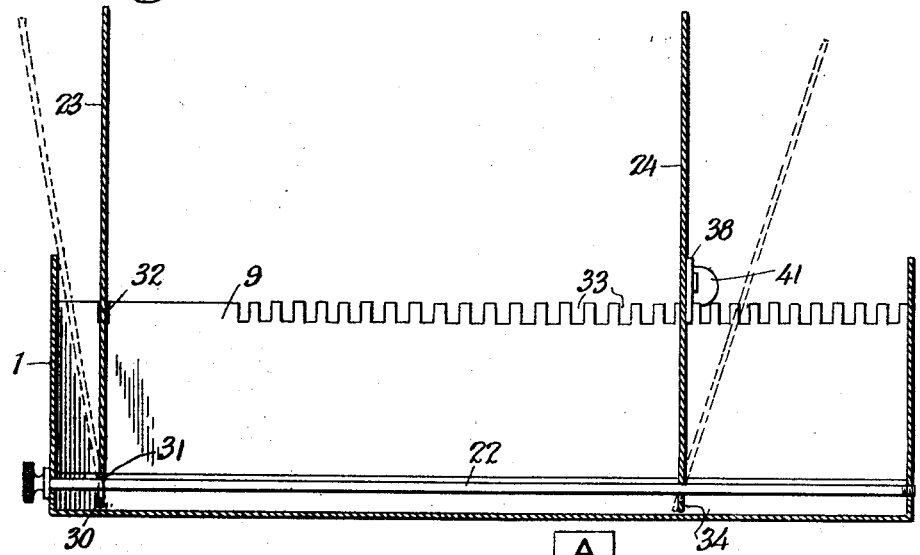
Fig. 3 is a vertical longitudinal section through the tray shown in Fig. 1, showing in full and dotted lines normal and released positions of the front and rear follower sheets.
Figure 4:
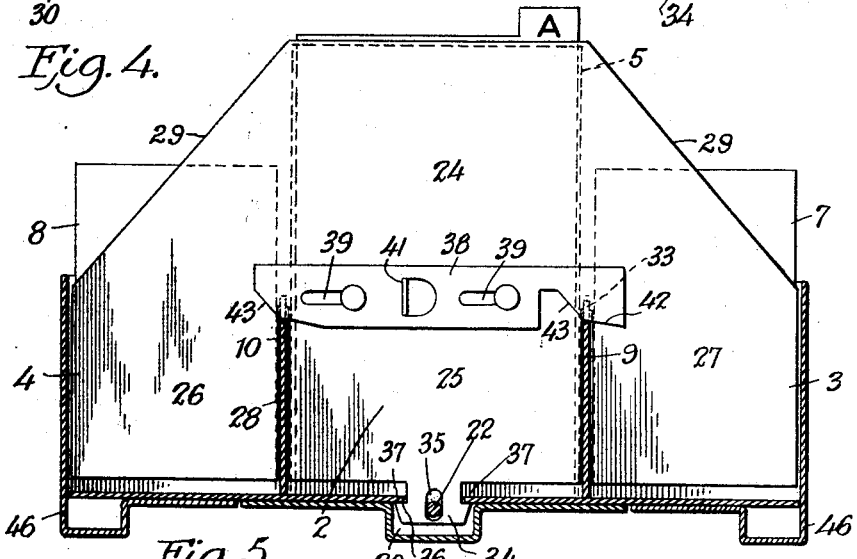
Fig. 4 is a vertical transverse section through the cabinet, showing in rear elevation the rear follower plate and its locking and releasing means.
Figure 5:
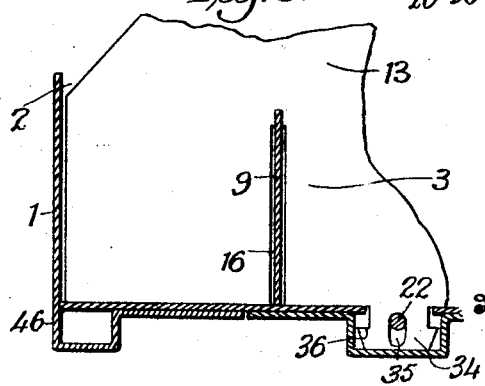
Fig. 5 is a detail transverse section through one side of the cabinet, showing the retaining connection between the front follower plate and one of the partitions.

In carrying my invention into practice, in the example shown in Figs. 1 to 5, inclusive, I provide a suitable cabinet or tray 1 having adjacent receiving spaces, chambers or compartments 2, 3 and 4, preferably arranged side by side or in parallel relation, as shown. Of these compartments, the center chamber or compartment 2 is designed to receive a desired or prescribed number of ledger or account sheets 5 and index cards 6, while the side compartments 3 and 4 are designed to receive debit and credit memoranda slips 7 and 8, respectively. The said compartments 2, 3 and 4 are made of proper widths and depths to receive account sheets, index cards and debit and credit slips of standards sizes, as used in any particular accounts of financial or commercial transactions, or of any arbitrary or determined sizes for particular purposes. These compartments are separated by longitudinally extending vertical division walls 9 and 10. The sheets 5, which are arranged in the compartment 2 in alphabetical order, may be made of ordinary paper stock, such as commonly used for ledger or account sheets, and suitably ruled and printed to receive debit and credit memoranda pertaining to bank or other accounts, while the cards 6, which are provided with the alphabetical index tabs 11, are made of cardboard or other suitable relatively stiff and strong and durable material. Where the account system is used for indicating the balances of the accounts of bank depositors, the slips 7 and 8 may be cancelled checks and deposit slips. When the account system is employed in stores for indicating the standing of accounts of customers of the store, the sheets 7 and 8 may be sales slips or other slips showing debits and credits. The debit and credit memoranda as shown by these slips may represent withdrawals and deposits, or they may represent amounts of sales and amounts paid on account, or other debit and credit transactions. The entries represented by these debit and credit memoranda slips may be posted at the end of each day's business and the totals footed up to show the balance or standing of the account from day to day. The entries, however, may be posted at other desired periods so as to show at times desired the standing of the accounts.

The center compartment 2 is also designed to receive the body portions 12 of account division sheets or cards 13, having at opposite sides thereof wings 14 and 15 to fit within the compartments 3 and 4. These wings 14 and 15 of each account division sheet or card are separated from the portion 12 thereof by vertical slots 16, opening at their lower ends through the bottom edge of the sheet or card, and which receive and adapt the sheet or card 13 to straddle the partition walls 9 and 10, whereby said sheets 13 are arranged so as to separate an account sheet in the compartment 2 from an adjacent account sheet and to separate slips 7 and 8 applying to the account represented by said account sheet from slips of other accounts in the compartments 3 and 4. Thus it will be understood that while the index cards 6 separate the account sheets falling under their proper class letters of the alphabet, the sheets 13 separate the different account sheets in each class letter group from one another and also separate their related memoranda sheets 7 and 8 in the compartments 3 and 4 from one another.

In practice, the division sheets 13 may be made of manila paper or other suitable paper stock of semi-rigid character or sufficiently rigid to maintain its shape even under pressure from a bulk of account sheets and slips in the compartments 2, 3 and 4, while being at the same time sufficiently flexible to adapt it for distortion under pressure to a certain degree to accommodate itself to different thicknesses of stacks of memoranda slips 7 and 8 in the compartments 3 and 4. The sheets 13 may have written or printed thereon the name of the person or concern appearing on the account sheet immediately behind it and which it separates from a preceding account sheet, or the sheet 13 may be suitably constructed to expose the name appearing on the following account sheet. In the present instance each sheet 13, which is generally coextensive in depth with the account sheet 6, is provided in its upper edge with a centrally disposed recess 17 through which a portion of the upper edge of the following account sheet 6 is exposed. The name of the person or concern to which such account sheets relate may therefore be so printed on the account sheet as to be exposed through the recess of its related preceding division sheet or card 13. The recesses 17 in the cards 13 also serve the further purpose of permitting the account sheets to be easily grasped between the thumb and forefinger of the hand of the operator to allow the sheets to be readily and conveniently removed whenever required from the cabinet or tray.

The wings or lateral projections 14 and 15 of each division sheet or card 13, in addition to acting as separators between the different stacks of memoranda slips 7 and 8 in the compartments 3 and 4, also act as indicating means to indicate those debit and credit memoranda slips applying to each account sheet. The wings 14 and 15 have obliquely cut away portions 18 to expose the debit and credit slips 7 and 8 of the individual accounts and to leave the outer upper corners of the sets of slips projecting so that the slip or slips pertaining to any individual account may be easily and conveniently grasped for removal. Such portions of the slips 7 and 8 may, of course, be suitably marked to indicate, if desired, the accounts to which they apply. Each sheet 13 has its portion 12 provided at its lower edge with a depending retaining projection 19 extending into a channel 20 depending from or depressed with relation to the bottom of the cabinet. This projection 19 is provided with an opening 21 for the reception and passage of the usual locking rod 22 whereby all the sheets 13 are secured in position against any tendency to casual displacement in the handling of the account sheets and slips. The slits 16 being of greater length than the depth of the partition walls 9 and 10 adapts each card to be slidably moved backward or forward in the compartments 2, 3 and 4 without interference from said partition walls, while the elongated slots 21 permit sufficient freedom of motion of the cards in a vertical plane to permit them to tilt to certain degrees forward or backward when the operator is manipulating the records for the purpose of locating, applying or removing or adjusting any of the account sheets.

In order to hold the sheets and other records contained in the compartments in compact shape and to properly protect them, front and rear follower sheets 23 and 24 may be employed. These sheets are preferably made of sheet aluminum or other suitable sheet-metal and are generally similar in construction to the division sheets or cards 13, except that the recesses 17 of the division sheets or cards are preferably omitted from the follower plates. Each follower plate comprises a body portion 25 and wings 26 and 27 separated from the body portion by slots 28 and said wings having portions cut away obliquely, as at 29, to expose the debit and credit memoranda 7 and 8. The front follower plate 23 has a bottom projection 30 similar in form to the projection 19 of the division cards 13, said projection 30 having an elongated opening 31 therein. The slots 28 in the follower plates 23 and 24, unlike the slots 16 of the division cards 13, are of less length than the depth of the partition walls 9 and 10, so that normally, or when the followers are in an erect position, the upper walls of slits 28 of the follower plates 23 and 24 will respectively engage and interlock with notches 32 and 33 in the upper edges of the partitions 9 and 10. The notches 32, one in each wall 9 and 10, are located adjacent to the front wall of the cabinet but sufficiently spaced therefrom so that by shifting the plate upwardly to release it from engagement with the notches 32, which is permitted by the elongated opening 31, the plate 23 may be tilted forwardly so as to rest in an inclined position against said front wall of the cabinet, as indicated in dotted lines in Fig. 3, which position of said plate permits of the account records of the compartments being separated and shifted forwardly to permit of their convenient inspection. The follower plate 24 has a depending projection 34 similar to the projection 30, except that it is provided, in addition to an elongated opening 35, with locking shoulders 36 underlying and normally spaced from locking projections 37 at opposite sides of the top of the channel 20. When the plate 24 is in release position it may be tilted backward, as indicated in dotted lines in Fig. 3, and the upper end walls of its slots 28 engaged with a pair of notches 33 to support it in such position. In order to adapt the plate 24 to be secured in clamping position so as to uniformly hold the account records, a latch device 38 is provided thereon for coaction with the locking members 36 and 37 and the notches 33. This latch device comprises a plate extending across the compartment 2 and having slots 39 therein to receive headed pins or studs 40 carried by plate 24 on which said latch plate is slidably mounted. The latch plate is further provided with a finger-piece 41, whereby it may be manipulated, and with inclined or cam edges 42 and 43. When the plate 24 is arranged in a predetermined working position, the end portions of the latch 38 seat within and project through certain of the notches 33 in the partition walls 9 and 10, thus holding the plate from longitudinal displacement. In the unlatched condition of the plate 24 the inclined edges 43 of the latch plate uncover the upper ends of the slots 28, and the plate 24 therefore may be moved backward or forward in the cabinet without interference. When, however, the latch plate is shifted to the locking position shown in Fig. 4, in which its inclined or cam edges 42 engage and ride upward on the bottoms of notches in the partition walls 9 and 10, the follower plate 24 is lifted to bring the shoulders 36 of projection 34 into engagement with the flanges 37, and thereby the plate 24 is locked by the frictional binding engagement between the surfaces 42 and bottoms of notches 33 of partition walls 9 and 10 and the engagement of shoulders 36 with flanges 37, thus holding the plate 34 against either longitudinal or vertical displacement.

In the use of the account system, it may be assumed, for purpose of example, that it is employed by a bank for keeping a record of deposit and withdrawal transactions of its customers. In the keeping of such accounts, the debit memoranda slips may represent cashed checks or the like and the credit memoranda slips deposit slips or the like, the amounts of which are, at the close of each day's business or at other suitable times, entered or posted upon the account sheets 5. By the described construction of cabinet and arrangement of the account sheets 5 in a center compartment, such as compartment 2, and the placing of the slips 7 and 8 in the opposite or side compartments 3 and 4, slips of like character are kept together and slips of unlike character held spaced or separated, so that ready reference to any particular slip of either kind may be easily, quickly and conveniently made. At the same time this arrangement of the account sheets and the slips so disposes the slips that the slips of the individual accounts will be separated from each other and indicated by the sheets 13, the cut-away portions 18 of which will expose portions of the slips 7 and 8 to enable the slips of particular accounts to be readily reached and inspected and grasped for removal. The cut-away spaces or recesses 17 in the sheets 13 further serve to expose portions of the account sheets 5 to indicate the positions of individual account sheets and to facilitate their removal from the cabinet. Each sheet 13 thus serves as a division sheet for separating account sheets in a central compartment and also separating debit and credit account memoranda pertaining to the different accounts arranged in compartments at opposite sides of the central compartment, and said division sheets further serve for indicating the account sheets to which the memoranda separated by the division sheets relate.

In the use of the account system by stores and others in keeping records of purchases made by customers and amounts paid by customers on their accounts from time to time, as well as the standing of the accounts from day to day or at predetermined times, the slips 7 disposed in the compartment 3 may represent sales slips and the slips 8 disposed in the compartment 4 may represent credit slips, or, for the greater convenience of the bookkeeping department of a store or other establishment the slips 7 contained in the compartment 3 may represent memoranda, either debit or credit or both, which have not been posted, while the slips 8 in the compartment 4 may represent memoranda which have been posted, enabling an accountant to easily and at all times keep track of the unposted and posted accounts.

It will, of course, be understood that instead of employing but a single compartment at each side of a center compartment 2, such as compartments 3 and 4, the tray may be enlarged and/or divided by additional partitions 44 to provide one or more additional compartments 45 at each side of the central compartment, as shown in Figs. 6 and 7, and in a similar manner the number of compartments may be increased to any extent desired. Also, the arrangement might be such that the cabinet, if desired, could be divided on each side of its longitudinal center with one or more groups each comprising a central compartment and one or more side compartments at each side thereof, and I therefore do not limit myself to the use of any particular number of compartments or groups of compartments in the account cabinet or tray.

Where the elements of the account system may be arranged within a box or case of convenient size, it will, of course, be understood that all the ledger sheets of the entire alphabetical series may be arranged within a single compartment 2, and in such event all the indicating or division cards 13 of the entire alphabetical series will be arranged within a single group of associated compartments 2, 3 and 4. In large banks or other large commercial institutions, however, it will be understood that, according to the number of accounts carried, the ledger sheets and cooperating sets of division sheets or cards may be separated as required throughout the alphabetical series and arranged as necessary or required in separate cabinets or trays or separate groups of compartments within the same cabinet or tray, each containing all the ledger sheets and indicating cards falling under a certain alphabetical letter or any series of them, as desired or required.

It will be evident from the foregoing that at the close of a day's business, or at other convenient times, the checks and deposit slips or other slips representing debits or withdrawals and credits or deposits constituting part of the day's business may be properly sorted and arranged in the compartments 3 and 4 in such a manner that the debit and credit memoranda applying to the particular accounts will be arranged in rear of the indicating cards 13 representing such accounts, and that as the checks and slips are sorted and placed in the compartments the indicating cards will at all times automatically indicate the ledger sheets to which the respective lots of memoranda relate and to which the items thereon are to be transferred or posted, thus saving time and labor in locating the ledger sheets and posting the same so as to indicate the balances or standing of the accounts affected by transactions in the day's business. The clerk in charge of posting the accounts has thus merely to figure the results of all debits and credits on each affected account as it occurs, upon a calculating machine, and then post the results upon the ledger sheet, which is immediately at hand for the purpose. By this means time, trouble and labor are saved over all other posting systems including those using loose-leaf ledger sheets of the ordinary type. By the arrangement of the memoranda-holding compartments at opposite sides of a central compartment containing the account sheets, the various sheets or slips pertaining to the accounts may be better distributed or balanced in the cabinet and a larger number of sheets accommodated with a cabinet of given size.

Where the cabinet or tray is made of sheet-metal, in parts or sections welded together, the channel 20 may be provided in a part or depressed portion underying the bottom walls of the compartments proper, and other projections or depressions 46 symmetrically arranged on opposite sides thereof may be provided to serve in connection with the portion 20 as supporting feet for the cabinet.

Having thus fully described my invention, I claim:—

1. An account system comprising a cabinet, partitions longitudinally dividing the cabinet into a space or compartment positioned centrally of the cabinet and a space or compartment at each side of said central compartment for receiving debit and credit memoranda, account sheets in the central compartment, and division sheets common to and having portions disposed in the several compartments for separating the account sheets in the central compartment and for separating in the side compartments the debit and credit memoranda pertaining to the individual account sheets.

2. An account system comprising a cabinet, partitions longitudinally dividing the cabinet into a space or compartment positioned centrally of the cabinet and a space or compartment at each side of said central compartment for receiving debit and credit memoranda, account sheets in the central compartment, and division sheets common to and having portions disposed in the several compartments for separating the account sheets in the central compartment and for separating in the side compartments the debit and credit memoranda pertaining to the individual account sheets, said division sheets having cutaway portions for exposing portions of the debit and credit memoranda in the side compartments.

3. An account system comprising a cabinet partitioned to provide a longitudinally extending central space or compartment and a longitudinally extending space or compartment at each side thereof for receiving debit and credit memoranda, account sheets in the central compartment, and division sheets common to the several compartments for separating the account sheets in the central compartment and for separating in the side compartments the debit and credit memoranda pertaining to the individual account sheets, each division sheet having a cutaway portion to expose an account sheet and cutaway portions to expose the debit and credit memoranda in the side compartments pertaining to said account sheet.

4. An account system comprising a cabinet, partitions longitudinally dividing the cabinet into a receiving space or compartment positioned centrally of the cabinet and a receiving space or compartment at each side of said central compartment, account sheets disposed in the central compartment, and division sheets disposed in the central compartment and separating the account sheets therein and having lateral extensions disposed in the side compartments for separating therein slips bearing account memoranda pertaining to different accounts to be posted upon the account sheets, said lateral extensions of the division sheets having portions cutaway to expose portions of the slips in the side compartments.

5. An account system comprising a cabinet, partitions longitudinally dividing the cabinet into a space or compartment positioned centrally of the cabinet and a space or compartment at each side of said central compartment for receiving debit and credit memoranda, account sheets in the central compartment, and division sheets for separating the account sheets and related debit and credit memoranda in the compartments, said division sheets having portions cutaway at an angle to expose said debit and credit memoranda.

6. An account system comprising a cabinet, partitions longitudinally dividing the cabinet into a space or compartment positioned centrally of the cabinet and a space or compartment at each side of said central compartment for receiving debit and credit memoranda, account sheets in the central compartment, and division sheets for separating the account sheets and related debit and credit memoranda in the compartments, said division sheets each comprising a body portion arranged in the central compartment and wings projecting therefrom and arranged in the side compartments, said wings having cutaway portions to expose the debit and credit memoranda.

7. An account system comprising a cabinet, partitions longitudinally dividing the cabinet into a space or compartment positioned centrally of the cabinet for receiving account sheets and a space or compartment at each side of the central compartment for receiving debit and credit memoranda pertinent to the respective account sheets, and division sheets in the central compartment separating the account sheets and having projections extending into the side compartments and forming means for indicating the account sheets to which the memoranda separated by the division sheets relate.

8. An account system comprising a cabinet, partitions longitudinally dividing the cabinet into a space or compartment positioned centrally of the cabinet for receiving account sheets and a space or compartment at each side of the central compartment for receiving debit and credit memoranda pertinent to the respective account sheets, and division sheets in the central compartment and separating the account sheets and having projections arranged in the side compartments and separating and indicating memoranda pertaining to particular account sheets, said projections being cutaway to expose said debit and credit memoranda.

9. An account system of the character described comprising a cabinet, partitions longitudinally dividing the cabinet into a compartment positioned centrally of the cabinet for receiving account sheets and a compartment at each side of the central compartment for receiving debit and credit memoranda slips, partitions between said compartments, and division sheets having portions disposed in the central and side compartments and separating the account sheets and the debit and credit memoranda slips pertaining thereto, said division sheets having slits to receive said partition walls and to permit the division sheets to slidably engage the same.

10. An account system comprising a cabinet, partitions longitudinally dividing the cabinet into a space or compartment positioned centrally of the cabinet and a space or compartment at each side thereof, partition walls between said compartments, account sheets in the central compartment, and division sheets having body portions arranged in the central compartment and separating the account sheets and having wings extending into the side compartments for separating therein and indicating debit and credit memoranda pertinent to the account sheets.

11. An account system comprising a cabinet partitioned to provide a longitudinally extending central space or compartment for receiving account sheets and a longitudinally extending space or compartment at each side thereof for receiving debit and credit memoranda pertinent to said sheets, and division sheets having body portions arranged in the central compartment and separating the account sheets and provided at their upper edges with recesses exposing portions of said sheets and having wings extending into the side compartments and separating the debit and credit memoranda therein and provided with cutaway portions for exposing such memoranda.

12. In an account system, a cabinet, having division walls longitudinally dividing said cabinet into compartments, said walls having notches at their upper edges, a holding rod on the cabinet, and follower members having slotted portions slidably engaging the holding rod to permit limited vertical movement thereof and having portions movable into and out of locking engagement with said notches in the division walls in such movements of the members.

13. In an account apparatus, a cabinet having a pair of parallel longitudinal walls and a transverse wall forming between them a compartment, said longitudinal walls having notches in the upper edge thereof, a holding rod on the cabinet, and a follower plate slidably engaging the holding rod and having portions to interlock with the notches in the longitudinal walls and to permit disengagement of the follower plate from said notches and tilting motion of the plate on the rod and into engagement with said transverse wall of the cabinet.

14. In an account system, a cabinet having a holding rod, spaced compartment-forming walls in said cabinet, said walls having notches in their upper edges, and a follower plate slidably and pivotally mounted on the holding rod and having portions for engagement with the notches in the walls to hold said plate in a vertical position or in a position inclined to the vertical.

15. An account system comprising a cabinet, partition walls longitudinally dividing the cabinet into a central compartment and side compartments, a guide channel communicating with the central compartment and having locking members overhanging the same, the said partition walls being provided with notches in their upper edges, a follower plate having portions disposed in the central and side compartments and provided with slots receiving said partition walls and having locking members movable in the guide channel and adapted to engage and disengage the overhanging locking projections on upward and downward movements of said follower plate, and a locking device engaging the notches in the partition walls and movable to shift the plate vertically for locking and unlocking movements.

16. An account system comprising a central receptacle and a receptacle arranged parallel therewith and at each side thereof, account sheets arranged in the central receptacle, the side receptacles being of suitable form and size to receive sorted debit and credit memoranda slips from which items are to be posted to the account sheets representing the different accounts, and indicating and division cards arranged within the central receptacle and separating the account sheets from each other and having wings extending into the side receptacles between the debit and credit memoranda slips to indicate the slips to which the account sheets relate.

17. An account system comprising a central receptacle and a receptacle arranged parallel therewith and at each side thereof, account sheets arranged in the central receptacle, the side receptacles being of suitable form and size to receive sorted debit and credit memoranda slips from which items are to be posted to the account sheets representing the different accounts, and indicating and division cards arranged within the central receptacle and separating the account sheets from each other and having wings extending into the side receptacles between the debit and credit memoranda slips to indicate the slips to which the account sheets relate, said wings having their upper portions cut away at an oblique angle to expose the outer upper corners of the slips in the side compartments.

In testimony whereof I affix my signature.

CLIFTON K. RAINEY.